United States Patent
Zhou et al.

(10) Patent No.: US 7,892,299 B2
(45) Date of Patent: Feb. 22, 2011

(54) METHODS OF MANUFACTURING FUEL CELL ELECTRODES INCORPORATING HIGHLY DISPERSED NANOPARTICLE CATALYSTS

(75) Inventors: Zhenhua Zhou, Salian (CN); Zhihua Wu, Plainsboro, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 1240 days.

(21) Appl. No.: 11/264,918

(22) Filed: Nov. 1, 2005

(65) Prior Publication Data
US 2007/0060471 A1 Mar. 15, 2007

Related U.S. Application Data

(63) Continuation-in-part of application No. 11/228,568, filed on Sep. 15, 2005.

(51) Int. Cl.
*H01C 17/28* (2006.01)
*B01J 21/00* (2006.01)
*B01J 23/00* (2006.01)
*B01J 25/00* (2006.01)
*B01J 29/00* (2006.01)
*H01M 4/88* (2006.01)
*B01J 31/00* (2006.01)

(52) U.S. Cl. .............. 29/623.1; 502/100; 502/101; 502/150; 502/172

(58) Field of Classification Search .............. 29/623.1, 29/621.3; 502/100, 101, 150, 172
See application file for complete search history.

(56) References Cited

U.S. PATENT DOCUMENTS

| | | | |
|---|---|---|---|
| 3,992,331 A | 11/1976 | Petrow et al. | 502/339 |
| 4,070,401 A | 1/1978 | Hirai et al. | 564/417 |
| 4,148,750 A | 4/1979 | Pine | 502/26 |
| 4,336,238 A | 6/1982 | Dalton, Jr. et al. | 423/584 |
| 4,336,240 A | 6/1982 | Moseley et al. | 423/584 |
| 4,347,231 A | 8/1982 | Michaelson | 423/584 |
| 4,347,232 A | 8/1982 | Michaelson | 423/584 |
| 4,366,085 A | 12/1982 | Ikegami et al. | 502/155 |

(Continued)

FOREIGN PATENT DOCUMENTS

CN   02106201.3   4/2002

(Continued)

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).

(Continued)

*Primary Examiner*—James E McDonough
(74) *Attorney, Agent, or Firm*—Workman Nydegger

(57) ABSTRACT

Nanoparticle catalysts are manufactured by first preparing a solution of a solvent and a plurality of complexed catalyst atoms. Each of the complexed catalyst atoms has at least three organic ligands. The complexed catalyst atoms are reduced to form a plurality of nanoparticles. During formation of the nanoparticles, the organic ligands provide spacing between the catalyst atoms via steric hindrances and/or provide interactions with a support material. The spacing and interactions with the support material allow formation of small, stable, and uniform nanoparticles. The supported nanoparticle catalyst is then incorporated into a fuel cell electrode.

22 Claims, 3 Drawing Sheets

U.S. PATENT DOCUMENTS

| | | | |
|---|---|---|---|
| 4,374,105 A | 2/1983 | Anderson et al. | 423/230 |
| 4,490,219 A | 12/1984 | Bindra et al. | 205/50 |
| 4,513,098 A | 4/1985 | Tsao | 502/216 |
| 4,581,344 A | 4/1986 | Ledoux et al. | 502/304 |
| 4,652,311 A | 3/1987 | Gulla et al. | |
| 4,760,187 A | 7/1988 | Kosak | 564/417 |
| 4,822,699 A | 4/1989 | Wan | 429/40 |
| 4,832,938 A | 5/1989 | Gosser et al. | 423/584 |
| RE33,149 E | 1/1990 | Petrow et al. | 429/40 |
| 5,061,671 A | 10/1991 | Kitson et al. | 502/185 |
| 5,128,114 A | 7/1992 | Schwartz | 423/335 |
| 5,132,099 A | 7/1992 | Hiramatsu et al. | 423/584 |
| 5,235,106 A | 8/1993 | Didillon et al. | 564/417 |
| 5,338,531 A | 8/1994 | Chuang et al. | 423/584 |
| 5,352,645 A | 10/1994 | Schwartz | 502/262 |
| 5,372,981 A | 12/1994 | Witherspoon | 502/155 |
| 5,480,629 A | 1/1996 | Thompson et al. | 423/584 |
| 5,489,563 A | 2/1996 | Brand et al. | 502/185 |
| 5,496,532 A | 3/1996 | Monzen et al. | 423/584 |
| 5,580,839 A | 12/1996 | Huffman et al. | 502/338 |
| 5,608,112 A | 3/1997 | Schwartz | 564/415 |
| 5,641,723 A | 6/1997 | Bonnemann et al. | 502/326 |
| 5,679,858 A | 10/1997 | Langer et al. | 564/423 |
| 5,767,036 A | 6/1998 | Freund et al. | 502/185 |
| 5,846,895 A | 12/1998 | Gila et al. | 502/107 |
| 5,846,898 A | 12/1998 | Chuang et al. | 502/181 |
| 5,859,265 A | 1/1999 | Muller et al. | 549/531 |
| 5,900,386 A | 5/1999 | Freund et al. | 502/330 |
| 5,922,488 A | 7/1999 | Marucchi-Soos et al. | 429/44 |
| 5,925,588 A | 7/1999 | Chuang et al. | 502/181 |
| 5,939,220 A | 8/1999 | Gunner et al. | 429/40 |
| 5,961,948 A | 10/1999 | Wanngard | 423/584 |
| 5,962,365 A | 10/1999 | Langer et al. | 502/180 |
| 5,962,741 A | 10/1999 | Baumeister et al. | 564/423 |
| 5,972,305 A | 10/1999 | Park et al. | 423/587 |
| 6,007,934 A | 12/1999 | Auer et al. | 429/44 |
| 6,054,043 A | 4/2000 | Simpson | |
| 6,054,507 A | 4/2000 | Funaki et al. | 523/210 |
| 6,090,858 A | 7/2000 | El-Sayed | 516/97 |
| 6,165,635 A | 12/2000 | Auer et al. | 429/44 |
| 6,168,775 B1 | 1/2001 | Zhou et al. | 423/584 |
| 6,231,980 B1 | 5/2001 | Cohen et al. | 428/402 |
| 6,239,054 B1 | 5/2001 | Shukis et al. | 502/29 |
| 6,294,696 B1 | 9/2001 | Didillon et al. | 564/422 |
| 6,316,673 B2 | 11/2001 | Giera et al. | 564/423 |
| 6,455,594 B1 | 9/2002 | Tsuji | |
| 6,462,095 B1 | 10/2002 | Bönsel et al. | |
| 6,515,845 B1 | 2/2003 | Oh et al. | 361/502 |
| 6,528,683 B1 | 3/2003 | Heidemann et al. | 562/542 |
| 6,551,960 B1 | 4/2003 | Laine et al. | 502/327 |
| 6,589,312 B1 | 7/2003 | Snow et al. | 75/255 |
| 6,673,953 B2 | 1/2004 | Keller et al. | 556/143 |
| 6,676,919 B1 | 1/2004 | Fischer et al. | 423/584 |
| 6,683,783 B1 | 1/2004 | Smalley et al. | 361/502 |
| 6,740,615 B2 | 5/2004 | Zhou | 502/29 |
| 6,746,597 B2 | 6/2004 | Zhou et al. | 208/138 |
| 6,815,391 B2 | 11/2004 | Xing et al. | 502/184 |
| 6,835,591 B2 | 12/2004 | Rueckes et al. | 438/99 |
| 6,866,801 B1 | 3/2005 | Mau et al. | 264/29.1 |
| 6,908,873 B2 | 6/2005 | Zhou et al. | 502/29 |
| 2002/0192141 A1 | 12/2002 | Little | 423/447.1 |
| 2003/0004058 A1 | 1/2003 | Li et al. | 502/258 |
| 2003/0104936 A1 | 6/2003 | Mao et al. | 502/339 |
| 2003/0185741 A1 | 10/2003 | Matyjaszewski et al. | 423/445 R |
| 2004/0005269 A1 | 1/2004 | Huang et al. | 423/447.3 |
| 2004/0037770 A1 | 2/2004 | Fischer et al. | 423/584 |
| 2004/0038808 A1* | 2/2004 | Hampden-Smith et al. | 502/180 |
| 2004/0047798 A1 | 3/2004 | Oh et al. | 423/414 |
| 2004/0087441 A1 | 5/2004 | Bock et al. | 502/313 |
| 2004/0101718 A1 | 5/2004 | Cao et al. | 429/13 |
| 2004/0110005 A1 | 6/2004 | Choi et al. | 428/402 |
| 2004/0141906 A1 | 7/2004 | Polverejan et al. | 423/418.2 |
| 2004/0147618 A1 | 7/2004 | Lee et al. | |
| 2004/0185251 A1 | 9/2004 | Wang et al. | 428/397 |
| 2004/0234444 A1 | 11/2004 | Shaffer et al. | 423/447.3 |
| 2004/0241502 A1 | 12/2004 | Chung et al. | 428/702 |
| 2005/0016839 A1 | 1/2005 | Horne et al. | 204/242 |
| 2005/0037255 A1 | 2/2005 | Ozaki et al. | 429/44 |
| 2006/0079396 A1 | 4/2006 | Saito | |

FOREIGN PATENT DOCUMENTS

| | | |
|---|---|---|
| EP | 0864362 | 9/1998 |
| GB | 1056125 | 1/1967 |
| JP | 10330103 | 12/1998 |
| JP | 2002-338219 | 11/2002 |
| JP | 2003-54922 | 2/2003 |
| JP | 2004-339041 | 2/2004 |

OTHER PUBLICATIONS

Li, et al., "Carbon Nanotubes as Support for Cathode Catalyst of a Direct Methanol Fuel Cell," *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells," *J. Phys. Chem*, B, vol. 107, pp. 6292-6299 (Jun. 6, 2003).

Lordi, et al., "Method for Supporting Platinum on Single-Walled Carbon Nanotubes for a Selective Hydrogenation Catalyst," *Chem. Mater.*, vol. 13, pp. 733-737 (Feb. 10, 2001).

Ohtsuka, Yasui, et al., "Char-Nitrogen Functionality and Interactions Between the Nitrogen and Iron I the Iron-Catalyzed Conversion Process of Coal Nitrogen to $N_2$," Research Center for Organic Resources and Materials Chemistry, Institute for Chemical Reaction Science, Tohoku University, Sendai, Japan, pp. 1356-1362 (May 6, 1998).

Matsumoto, et al., "Reduction of Pt usage in fuel cell electrocatalysts with carbon nanotube electrodes," *Chem. Commun.*, The Royal Society of Chemistry 2004, 2004, pp. 840-841.

Li, et al., "Homogeneous and controllable Pt particles deposited on multi-wall carbon nanotubes as cathode catalyst for direct methanol fuel cells," *Letters to the Editor/Carbon 42*, Dalian University of Technology, pp. 436-439 (2004).

Han, Sangjin, et al., "Simple Solid-Phase Synthesis of Hollow Graphitic Nanoparticles and their Appliation to Direct Methanol Fuel Cell Electrodes," *Adv. Mater*. 2003, 15, No. 22, Nov. 17, pp. 1922-1925.

Hod, Oded, et al., "Carbon nanotube closed-ring structures", *Physical Review*, B 67, 195408 (2003).

Wang, Zhong L., et al., "A rich family of slinky materials," *Materials Today*, Apr. 2004, p. 7.

Zhen Liu, et al., "Formation of nanoparticles rings on heterogeneous soft surfaces," *IOP Electronic Journals*, Nanotechnology, 11 (Nov. 2004).

Bell, Linda, Editor/Publisher, *Nanotech Briefs*, vol. 1, No. 1, (Jan. 2004); www.nanotechbriefs.com.

Drzal, Lawrence T., "Nanotechnology Applications for Green Manufacturing," Michigan State University, College of Engineering, CMSC, Aug. 18, 2004.

Hester, J.R., et al., "Nanoparticle-templated carbon nanotube ring nucleus formation," *Applied Physics Letters*, (Apr. 8, 2002), vol. 80, No. 14, p. 2580-2.

Ibarra, M. R., "Magnetism of Nanometric 3d-Metal Particles in Carbon Cages: Possible Relevance for Biomedical Applications," presentation, Jun. 12, 2003.

Tate et al.; Inorg. Chem.; 1962, (1), 433-434.

* cited by examiner

METHODS OF MANUFACTURING FUEL CELL ELECTRODES INCORPORATING HIGHLY DISPERSED NANOPARTICLE CATALYSTS

CROSS-REFERENCE TO RELATED APPLICATION

This application is a continuation-in-part of copending U.S. application Ser. No. 11/228,568, filed Sep. 15, 2005, and entitled "Supported Nanoparticle Catalyst Manufactured Using Caged Catalyst Atoms," the disclosure of which is incorporated herein in its entirety.

BACKGROUND OF THE INVENTION

1. The Field of the Invention

The present invention relates to the manufacture of fuel cell electrodes. More particularly, the present invention relates to the manufacture of electrodes having highly dispersed nanoparticles manufactured from complexed catalyst atoms.

2. Related Technology

Particle catalysts are an important component of fuel cells. The catalyst is incorporated into the electrode of each half cell to increase the rate of the reactions in the fuel cell. Improving catalyst performance can increase power output of a fuel cell, reduce the size of the fuel cell, and/or allow the fuel cell to operate at lower temperatures. Because fuel cells are typically made from precious metals such as platinum and ruthenium, improvements in catalyst performance can also significantly reduce the cost of the fuel cell.

Performance of fuel cell catalysts has typically been improved by reducing the size of the catalyst particles. Particulate catalysts are only active at the surface. Reducing the size of the catalyst particles increases the surface to weight ratio, thereby increasing catalyst performance. Recent improvements in techniques for manufacturing particle catalysts have enabled formation of nanoparticles having an average size of less than 5.0 nm. Even at these extremely small sizes, there is still a significant amount of metal that is not exposed on the outer surface, resulting in low metal utilization. For example, 2.5 nm platinum particles in a face centered cubic ("fcc") crystal structure utilizes about 45% of the platinum atoms, whereas a 5.0 nm particle utilizes only about 23% of the platinum atoms. Therefore, to reach nearly atomic dispersion, the average particle size of the metal needs to be 2.5 nm or less, typically 1.5 nm or less.

One problem with making and maintaining particles less than 2.5 nm is particle stability. Particle stability is known to depend on particle surface area. As the surface area increases, the particle surface energy also increases, which can cause agglomeration of the catalyst particles. At particle sizes of 2.5 nm or less the surface energy is very high and catalyst made using existing methods agglomerate to form lager particles.

BRIEF SUMMARY OF THE INVENTION

The present invention provides a method for manufacturing fuel cell electrodes having finely dispersed catalyst nanoparticles. The fuel cells of the present invention include an electrolyte layer that separates a fuel electrode and an oxygen electrode. The fuel electrode and/or the oxygen electrode include catalyst nanoparticles configured to carry out a fuel cell reaction. The catalyst nanoparticles are manufactured from catalyst atoms that are caged between (e.g., complexed with) three or more ligands. The caged, complexed catalyst atoms are formed in a colloidal solution by heating. In a preferred embodiment, the solution is heated to greater than 40° C., more preferably greater than 60° C., and most preferably greater than 95° C.

During the intermediate steps of forming the catalysts particles, the organic ligands provide spacing between the catalyst atoms through steric hindrance (i.e., the caging effect). Thus, prior to formation of the nanoparticles, the catalyst atoms are atomically dispersed. This dispersion of catalyst atoms leads to formation of very small catalyst particles. The catalyst particles can form in solution or on a support material.

In an exemplary embodiment, methods of the present invention produce nanoparticles having an average particle size between about 0.5 and about 2.5 nm, although other particle sizes can be obtained if desired.

Another advantage of atomically dispersing the catalyst atoms is the formation of substantially uniformly dispersed catalyst nanoparticles. Because the catalyst atoms are initially dispersed (in solution or on the support material), the resulting catalyst nanoparticles are more uniformly dispersed on the support. More uniform dispersion can lead to improved catalyst performance and durability.

In one embodiment, the organic ligands provide spacing through steric hindrances between the ligands on different catalyst atoms. However, the organic ligands can also form small, dispersed, and uniform particles through interactions with the support material. It is currently believed that complexed catalyst atoms that interact or bond with the support material during formation are able to form smaller particles due to the increased resistance to agglomeration.

In one aspect of the present invention, increased interaction between the particles and the support are created by using a low viscosity solution of the complexed catalyst atoms. The low viscosity of the solution allows the complexed catalyst atoms to interact better with the support material than high viscosity solvents. One method for providing a low viscosity solution includes using an aqueous solution. In a preferred embodiment, the solution comprises at least 2% water, more preferably at least about 10% water, even more preferably at least about 30% water, and most preferably at least about 50% water.

In another exemplary embodiment, increased interaction between the support and the complexed catalyst atoms is provided by using organic ligands that can bond to the support material. In a preferred embodiment, at least one of the three or more ligands complexed with the catalyst atoms has a functional group that is capable of bonding to the support material. Functional groups suitable for bonding to typical support materials include one or more of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide.

Bonding the catalyst atoms to the support surface can also improve the catalyst stability during use. By anchoring the particles to the support, the bonding between the particle and the support counteracts the forces generated from high surface energy. This feature is particularly advantageous for particles less than about 2.5 nm in diameter.

These and other advantages and features of the present invention will become more fully apparent from the following description and appended claims as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1:
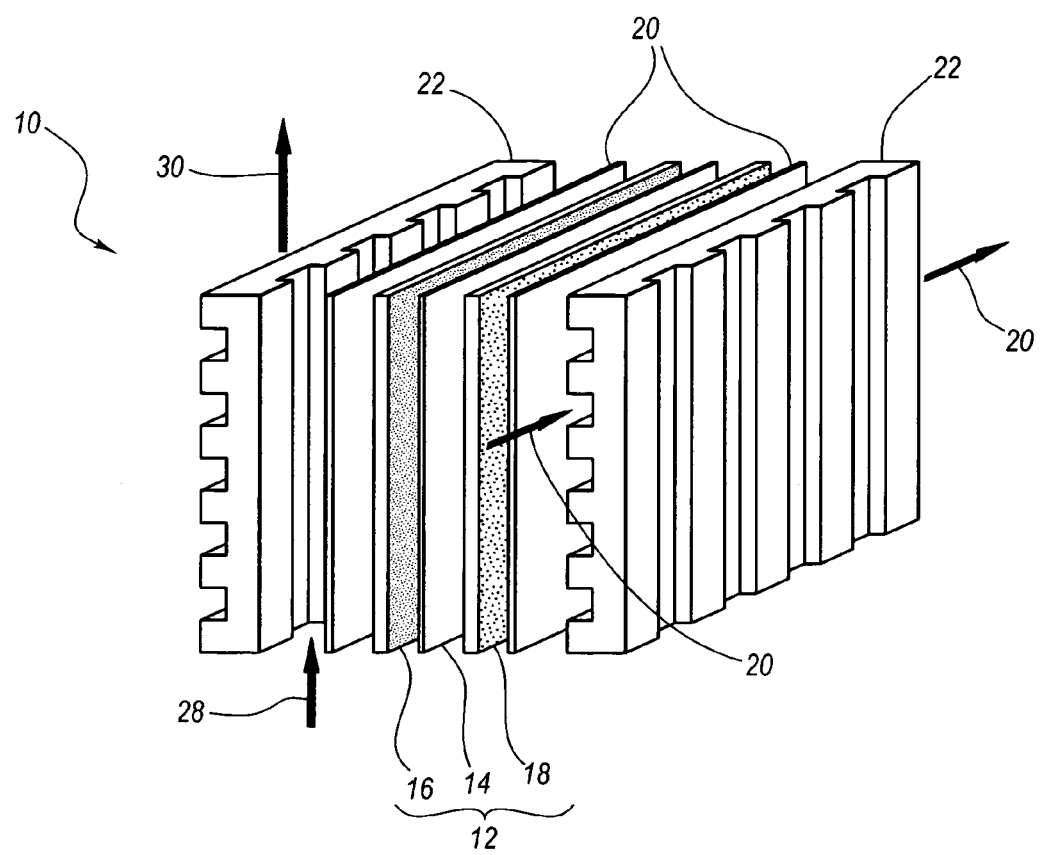
FIG. 1 is a fuel cell electrode membrane assembly according to one embodiment of the present invention

The present invention is directed to methods for manufacturing fuel cells and fuel cell electrodes. The fuel cells of the present invention include an electrolyte layer that separates a fuel electrode and an oxygen electrode. The fuel electrode and/or the oxygen electrode include highly dispersed catalyst nanoparticles for catalyzing a fuel cell reaction.

The catalyst nanoparticles are manufactured using a dispersing agent to achieve particle size and uniformity that gives the fuel cell improved performance. The catalyst nanoparticles are manufactured by first preparing a solution that includes a solvent and a plurality of catalyst atoms that are complexed with at least three organic ligands. The complexed catalyst atoms are reduced to form a plurality of nanoparticles. During formation of the nanoparticles, the organic ligands provide spacing between the catalyst atoms via steric hindrances and/or provide interactions with a support material. The spacing and/or interactions with the support material allow formation of small, stable, and/or uniform nanoparticles. The catalyst nanoparticles are then deposited on or in a fuel cell electrode.

For purposes of the present invention, the term "particle size" refers to average particle size.

For purposes of the present invention the number of ligands is determined by the number of atoms complexed with the catalyst atom. Where a single molecule binds to the catalyst atom through more than one functional group, the number of ligands for the single molecule is the number of functional groups bound to the catalyst atoms. Thus a bidentate ligand should be counted as two ligands.

II. Components Used to Make Fuel Cell Catalysts

A. Complexed Catalyst Atoms

Catalyst complexes include one or more different types of active catalyst atoms complexed with one or more types of organic ligands. In an exemplary embodiment, the catalyst atoms are treated such that three or more dispersing agent molecules ligate each catalyst atom, thereby forming three or more ligands per catalyst atom. The three or more organic ligands can be the same or different molecules. When so complexed, the catalyst atoms are arranged in such a manner that the catalyst atoms form dispersed nanocatalyst particles on the fuel cell support.

1. Catalyst Atoms

Any element or group of elements that can exhibit catalytic activity in a fuel cell and complex with the organic ligands can be used to form catalyst complexes and catalysts according to the invention. Whether a particular metal is appropriate for a fuel cell generally depends on the reactants to be used in the fuel cell. A typical fuel cell oxidizes hydrogen or light alcohol. Suitable catalyst atoms for performing such reactions include platinum and platinum-based alloys or mixtures. Preferred metals include those selected from Group VIB, preferably Cr; Group VIIIB, preferably Fe, Ru, Co, Pt, or Pd; and/or Group IVA, preferably Sn.

2. Organic Ligands

The complexed catalyst atoms include three or more organic ligands (also referred to as dispersing agent molecules). The organic ligands are selected to promote the formation of nanocatalyst particles that have a desired size, stability, and/or uniformity. Typically, the ligands are provided by reacting the catalyst atoms with a dispersing agent. The dispersing agent molecules react with the catalyst atoms to form ligands complexed with the catalyst atoms.

Dispersing agents suitable for complexing catalyst atoms include a variety of small organic molecules, polymers and oligomers. Typically, the dispersing agent interacts and bonds with catalyst atoms dissolved or dispersed within an appropriate solvent or carrier. Bonding can occur through various suitable mechanisms for obtaining ligands, including ionic bonding, covalent bonding, and lone pair electron bonding.

To provide the bonding between the dispersing agent molecules and the catalyst atoms, the dispersing agent includes one or more appropriate functional groups. In one embodiment, the functional group(s) comprise a carbon atom bonded to at least one electron-rich atom that is more electronegative than the carbon atom and that is able to donate one or more electrons so as to form a bond or attraction with a catalyst atom. Preferred dispersing agents include functional groups which have either a charge or one or more lone pairs of electrons that can be used to complex a metal catalyst atom. These functional groups allow the dispersing agent to have a strong binding interaction with the catalyst atoms.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. Typically the molar ratio of dispersing agent functional groups to catalyst atoms is preferably in a range of about 0.1:1 to about 50:1, more preferably in a range of about 0.5:1 to about 10:1, and most preferably in a range of about 0.75:1 to 5:1.

The dispersing agent allows for the formation of very small and uniform nanoparticles. In general, the nanocatalyst particles formed in the presence of the dispersing agent are less than about 2.5 nm. In some cases, the nanocatalyst particles may be atomically dispersed. The nanocatalyst particles preferably have an average size less than about 2.0 nm and more preferably less than about 1.5 nm in diameter. In some cases the advantages of the present invention are beneficial for forming nanoparticles having larger sizes (e.g., less than 50 nm or less than 10 nm). For these particles, the complexes of the present invention are advantageous for forming particles with a uniform size.

Finally, depending on the desired stability of the nanocatalyst particles on the support material, the dispersing agent can be selected to act as an anchor or tether between the nanocatalyst particles and the support material. While the dispersing agent has the ability to inhibit agglomeration of the nanocatalyst particles in the absence of anchoring, chemically bonding the nanocatalyst particles to the support material through a ligand is an additional and particularly effective mechanism for preventing agglomeration.

Anchoring is generally carried out by selecting a dispersing agent that will have functional groups available for bonding to a support material. The functional groups for bonding to the support are in addition to the functional groups for complexing with the catalyst atoms. Suitable functional groups for bonding with the support are the same as those described above with respect to bonding to the catalyst atoms. However, dispersing agent molecules can have different functional groups for bonding to the support and bonding to the catalyst atoms.

B. Solvents and Other Additives

The solution in which the organically complexed nanocatalyst composition is prepared may contain various solvents, including water and organic solvents. Solvents participate in catalyst formation by providing a solution for the interaction of catalyst atoms and dispersing agent. In some cases, the solvent may help to disperse the complexed catalyst atoms, but it does not complex with the catalyst atoms. In one embodiment, the solvent also allows the nanoparticles to form a suspension. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

In a preferred embodiment, the solution has a low viscosity. Preferably the viscosity is sufficiently low such that the complexed catalyst atoms are free to flow within the solution. In this case, the ligands, which are bonded to the catalyst atoms, interact to provide the desired spacing between catalyst atoms. In an exemplary embodiment, the solution includes water to provide a suitable viscosity. In a preferred embodiment, the solution includes greater than about 2% water, more preferably greater than about 10% water, even more preferably greater than about 30% water, and most preferably greater than about 50% water.

The catalyst composition can also include additives to assist in the formation of the nanocatalyst particles. For example, mineral acids and basic compounds can be added, preferably in small quantities (e.g., less than 5 wt %). Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be easily separated from the final catalyst solution or suspension using simple techniques such as centrifugation and filtration. Solid materials can also be added to remove unwanted byproducts. For example, activated carbon is a relatively inexpensive material that can be used to remove some unwanted by-products formed during catalyst preparation.

C. Fuel Cell Catalyst Supports and Support Materials

The organically complexed nanocatalyst particles are preferably formed on a porous and conductive support material. Conductive supports can improve fuel cell performance by increasing the efficiency of electron transport in the fuel cell electrode. Suitable conductive support materials include carbon black and similar materials. Other suitable conductive supports include carbon nanorings and carbon nanotubes.

The support material is also preferably porous. Porous supports are beneficial in fuel cell electrodes because they facilitate mass transfer. Facilitating the transfer of reactants within the fuel cell can increase the efficiency of the fuel cell. In a preferred embodiment, the surface area of the support is at least about 20 m$^2$/g, more preferably greater than about 50 m$^2$/g.

The nanocatalyst particles may be deposited on a support within a wide range of loadings on the support material. The loading can range from about 0.01% to about 90 wt % of the supported nanocatalyst particles, more preferably in a range of about 0.1% to about 60%.

III. Methods of Making Nanocatalyst Compositions

The process for manufacturing the supported catalyst used in the fuel cells of the present invention can be broadly summarized as follows. First, one or more types of catalyst atoms and one or more types of dispersing agent molecules are selected. Second, the catalyst atoms (e.g., in the form of a ground state metal or metal salt) and dispersing agent (e.g., in the form of a carboxylic acid salt) are reacted or combined together to form complexed catalyst atoms having at least three dispersing agent molecules attached (i.e., three or more organic ligands). Next the complexed catalyst atoms are dispersed on the support to form an intermediate supported catalyst. Finally, catalyst nanoparticles are formed on the support from the complexed catalyst atoms (e.g., by reducing the complexed catalyst atoms). Alternatively, the catalyst nanoparticles can form in solution.

The complexed catalyst atoms are generally formed by first dissolving the catalyst atoms and dispersing agent in an appropriate solvent or carrier and then allowing the catalyst atoms and dispersing agent molecules to form a complex. The various components may be combined or mixed in any sequence or combination. In addition, a subset of the components can be premixed prior to addition of other components, or all components may be simultaneously combined.

Ligating the catalyst atoms with at least three organic ligands (preferably 4 or more ligands) typically requires heating the colloidal dispersion of catalyst atoms and organic ligands as the organometallic complexes are being formed. In a preferred embodiment, the temperature of the colloidal solution during complex formation is greater than 40° C., more preferably greater than 60° C., and most preferably greater than 95° C. Colloids with temperatures above 100° C., can be accomplished by using pressure and/or solvents with boiling points higher than 100° C.

In an exemplary embodiment, the catalyst atoms are complexed with three or more dispersing agent molecules (preferably 4 or more) by refluxing the dispersing agent and the catalyst atoms for between about 1 to about 4 hours at about 100° C.

Forming complexes of metal atoms is known in the art. Some metal complexes suitable for use with the present invention are commercially available. However, the foregoing steps for forming the complexed catalyst atoms provides greater flexibility for obtaining complexed catalyst atoms that have particular functional groups for bonding with the metal center, bonding with the support and/or for providing proper spacing between catalyst atoms.

The complexed catalyst atoms are dispersed on the support using a proper solvent. As mentioned above, the solvent is selected to allow the complexed catalyst atoms to be spaced on the support so as to be atomically dispersed. The solvent can also be selected to facilitate binding between the support and complexed catalyst atoms. In an exemplary embodiment, the complexed catalyst atoms are dispersed on the support using ultrasonic mixing to avoid prematurely forming catalyst nanoparticles.

It is currently believed that the complexed catalyst atoms form small particles because of the spacing that the ligands provide and/or the interactions that the ligands have with the support. By complexing the catalyst atoms with three or more ligands, the catalyst atoms can be protected on all sides or at least on a greater portion of the area surrounding the catalyst atom. Preferably the complexed atoms are protected in three dimensions such that each catalyst atom has a molecular cage. Schemes 1 and 2, shown below, illustrate the caging effect that three or more ligands can have on the catalysts atoms.

Scheme 1

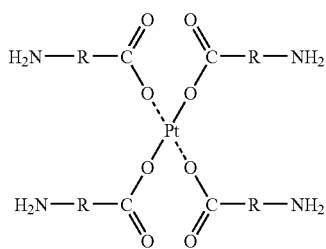

-continued
Scheme 2

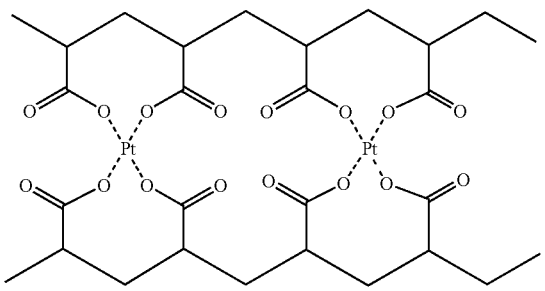

The ligand structure around the catalyst atoms inhibits agglomeration of catalyst atoms during particle formation thereby reducing the size of the particles formed. In addition, the ligands forming the cage can advantageously interact with the support material to keep the catalyst atoms more dispersed on the support during particle formation.

In a preferred embodiment, the catalyst nanoparticles are formed on a support material during a reduction step. Suitable agents useful for carrying out the reduction step include hydrogen and small organic molecules capable of reducing the metal complexes. In some cases, reduction can also be carried out by heating. However, excessive heating tends to cause greater agglomeration and larger particle sizes.

In a preferred embodiment process conditions are maintained so as to prevent catalyst particles from forming before the complexed catalyst atoms are atomically dispersed on the support. For example, in a preferred embodiment, the complexed catalyst atoms are not subjected to a reduction step or reducing heating step until after the complexed catalyst atoms have been atomically dispersed on the support material.

The methods of the present invention advantageously allow formation of particles having desired particle sizes and particle size distributions. In a preferred embodiment, nanoparticles formed using the methods of the present invention have a particle size less than about 2.5 nm, more preferably less than about 2.0 nm, and most preferably less than about 1.5 nm. These particle sizes can be obtained according to the methods of the present invention by using low viscous solvents and or by using ligands that provide the necessary spacing between atoms during particle formation.

Water is a particularly good solvent for forming particles less than about 2.5 nm in diameter. Even small percentages of water as a solvent are very effective at allowing the complexed atoms to interact with the support. In a preferred embodiment, formation of particles is performed in a solution with a water content of at least about 2% water, more preferably about 10% water, even more preferably about 30% water, and most preferably about 50% water. In addition to improving particle formation, using lower viscous solvents (e.g., water) improves the interaction of the catalyst particles after formation thereby by reducing the incidence of attrition of the catalyst particles.

During reduction, some or most of the ligands can be removed from the catalyst atoms to allow the catalyst particles to become catalytically active. Preferably the catalyst atoms crystallize to form nanoparticles having a desired crystal face exposure.

In a preferred embodiment, the reduction step is limited such that at least a portion of the ligands remain bonded to a portion of the catalyst atoms. As discussed above, the ligand can be selected to include a functional group that can bond to the support material to tether the catalyst nanoparticles to the support. Bonding the catalyst nanoparticles to the support material further reduces agglomeration of the catalyst nanoparticles during use.

IV. Fuel Cells and Fuel Cell Catalysts

The highly dispersed catalysts of the present invention are supported on a conductive support such that they can be used in the electrode of a fuel cell. The nanoparticles are typically deposited on the support material using a solvent. Suitable solvents for depositing the catalysts particles on the conductive support include ethylene glycol, methanol, ethanol, acetone, water, and the like.

The conductivity of the support allows for efficient transfer of electrons to and/or from the catalyst and thus increases the efficiency of the oxidation and/or reduction reactions at the cathode and anode. Preferably the catalyst support is also highly porous to facilitate transfer of reactants to and/or from the surface of the nanoparticles on the support. In a preferred embodiment, the fuel cell catalysts of the present invention comprise highly dispersed nanoparticles supported on a carbon nanoring, which provides superior conductivity and porosity verses traditional fuel cell supports such as carbon black.

To obtain desired power density in the fuel cell, the supported catalyst particles are preferably of a desired size. Preferably the methods of the present invention are used to obtain fuel cell catalyst having an average particle size of less than about 20 nm, more preferably less than about 6 nm, even more preferably less than about 4 nm and most preferably less than about 2 nm. The catalyst nanoparticles are loaded on the support with a metal loading of about 0.1-80 wt %.

FIG. 1 shows the structure of a typical fuel cell according to the present invention. The fuel cell 10 includes a membrane-electrode assembly 12, which includes a solid polymer electrolyte membrane 14, a fuel electrode 16 (i.e., the anode), and an oxygen electrode 18 (i.e., the cathode).

The membrane-electrode assembly is sandwiched between supporting current collectors 20 and separators 22. The separators 22 have horizontal and vertical channels that allow fuel and byproducts to enter and exit the fuel cell 10. Arrow 24 represents air or oxygen entering the fuel cell and arrow 26 represents air or oxygen and water exiting the fuel cell. Arrow 28 represents fuel (e.g., methanol) and water entering the fuel cell and arrow 30 represents residual fuel, byproducts (e.g., carbon dioxide), and water exiting the fuel cell.

The nanocatalyst of the present invention is incorporated into the fuel electrode 16 and/or the oxygen electrode 18. In an exemplary embodiment, electrodes 16 and 18 are made by mixing the supported nanocatalyst with an electrode material and then depositing the mixture on electrolyte layer 10. The electrode material can be a curable material or similar type material and can be applied to the electrolyte layer 10 by spin coating or other appropriate technique. Fillers and other components can be added to the electrode material to give it desired properties such as conductivity and gas permeability.

Electrolyte layer 10 is a material suitable for conducting ions. Electrolyte layer 10 can be any material capable of conducting ions and is preferably a polymer electrolyte. Polymers are selected to be chemically stable and compatible with the fuel cell catalyst so as to avoid poisoning the catalyst. Suitable polymers include, for example, polyethylene oxide, poly(ethylene succinate), poly (O-propiolactone), and sulfonated fluoropolymers such as Nafion® (DuPont Chemicals, Wilmington, Del.).

V. Examples

Example 1

Pt/C Catalyst Preparation

A 40 wt % Pt/C was prepared using platinum as active component, a conductive support, and glycine as the dispersing agent. The catalyst was prepared using the following steps and concentrations:

(1) 300 mg of Ketjen carbon black was placed under vacuum for 1.0 hr and then impregnated with 40 ml water.

(2) Solution A was prepared by mixing 783.7 mg of an aqueous solution of $H_2PtCl_6$ containing 25.52 wt % Pt into 30 ml water.

(3) Solution B was prepared by dissolving 77 mg of glycine in 30 ml water to provide a 1:1 mole ratio of anchoring agent to metal.

(4) Solution C was obtained by refluxing a mixture of solution A and solution B for 1 hour.

(5) Solution C was ultrasonically suspended on the pretreated carbon black for 1 minute. The resulting slurry was dried by heating on a hotplate at 70° C. while stirring, and further dried for 2 hours in an oven at 70° C.

(6) The resulting powder was reduced with 5% $H_2$ ($H_2/N_2$, 5/95=V/V) under atmospheric pressure at 100° C. for 3 hours, and cooled under 100 mL/min nitrogen for one hour.

Figure 2:
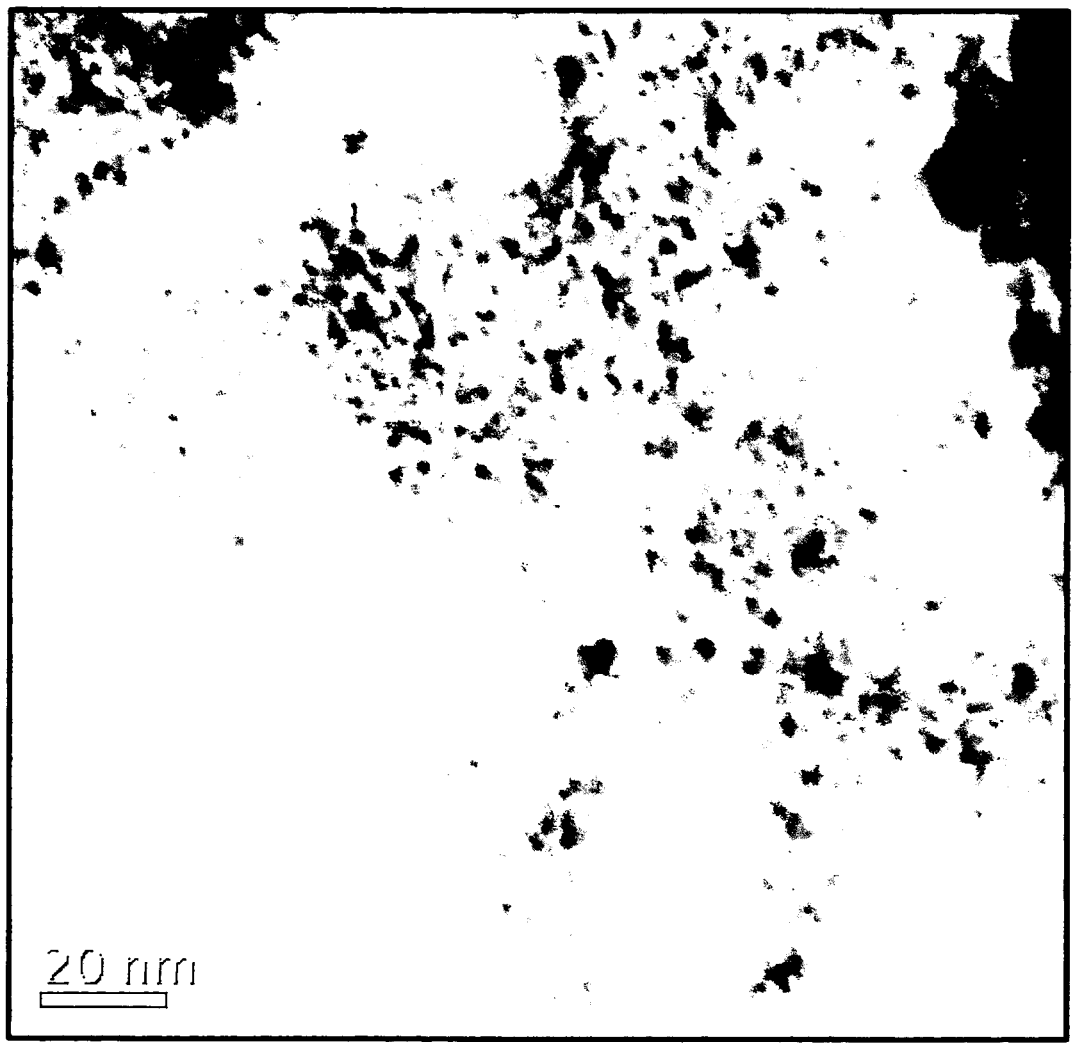
FIG. 2 is a TEM image of platinum nanoparticles on carbon manufactured using the method of the present invention.

The catalyst obtained using the method of Example 1 is shown in the TEM image of FIG. 2. As can be seen in FIG. 2, the catalyst particles formed using the z M method of Example 1 are finely dispersed on the surface of the carbon support.

Example 2

PtRu/C Catalyst Preparation

In example 2, a 30 wt % Pt-15 wt % Ru on carbon catalyst was prepared using platinum, ruthenium, a conductive support, and a glycolic acid dispersing agent. The catalyst was prepared using the following steps and concentrations:

(1) 275 mg of XC-72R carbon black was placed under vacuum for 1.0 hr and then impregnated with 30 ml water.

(2) Solution A was prepared by mixing 587.77 mg of an aqueous solution of $H_2PtCl_6$ containing 25.52 wt % Pt into 25 ml water.

(3) Solution B was prepared by adding 22.44 g of 3.3688 mg Ru/ml $RuCl_3$ aqueous solution to Solution A.

(4) Solution C was prepared by dissolving 164 mg of glycolic acid containing 70 wt % glycolic acid into 30 ml water.

(5) Solution D was obtained by mixing solution B and solution C together with 1 ml of 2 M HCl and then refluxing for 1 hour.

(6) Solution D was ultrasonically suspended on the pretreated carbon black for 1 minute. The resulting slurry was dried up on the hotplate at 70° C. while continuously stirring, and further dried for 2 hours in oven at 70° C.

(7) The resulting powder was reduced with 5% $H_2$ ($H_2/N_2$, 5/95=V/V) under atmospheric pressure at 200° C. for 3 hours, and cooled down under 100 mL/min nitrogen for one hour.

Figure 3:
FIG. 3 is a TEM image of platinum-ruthenium nanoparticles on carbon manufactured using the method of the present invention.
Figure 1:
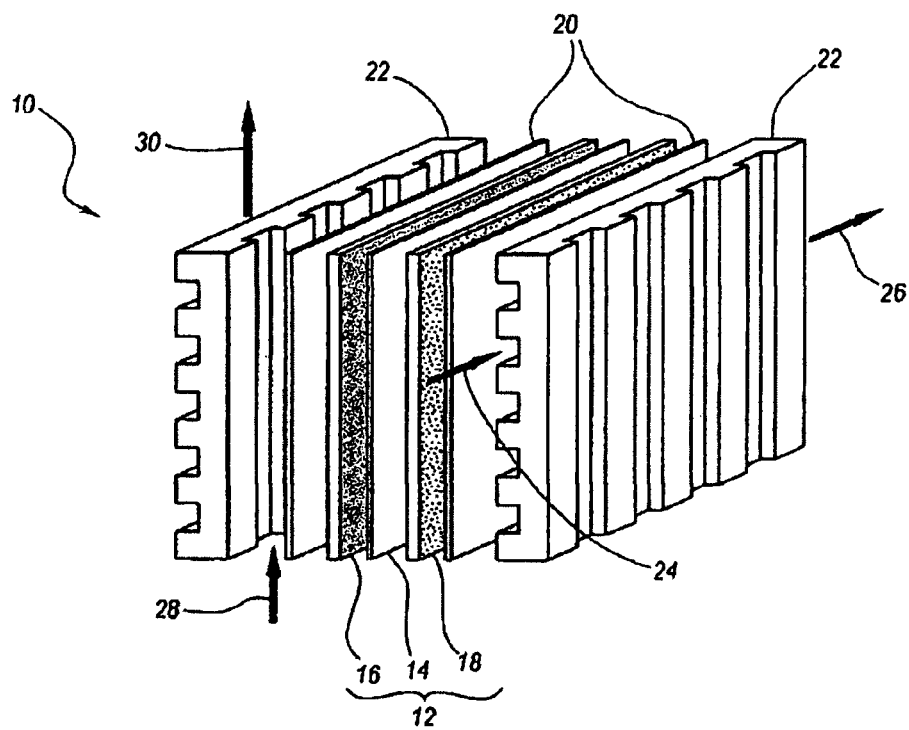

FIG. 3 shows catalyst particles manufactured using the method of Example 2. The high resolution TEM image shows dispersed nanoparticles with average sizes of less than about 2.5 nm.

The present invention may be embodied in other specific forms without departing from its spirit or essential character-

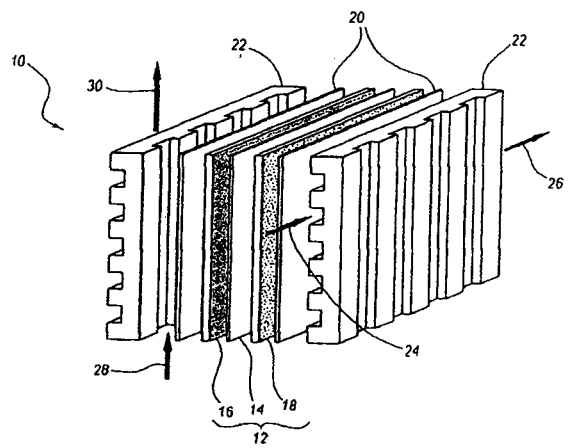

What is claimed is:

1. A method for manufacturing a fuel cell electrode having supported nanocatalyst particles, comprising:
   (a) forming a solution comprising a plurality of catalyst atoms and a plurality of organic ligands in the absence of a conductive support material;
   (b) heating the solution to a temperature greater than about 40° C. in the absence of a conductive support material and allowing the catalyst atoms and the plurality of organic ligands to react to form a plurality of organometallic complexes in which each catalyst atom is complexed with and caged between at least three organic ligands;
   (c) causing or allowing formation of catalyst nanoparticles from the organometallic complexes, wherein during formation of the nanoparticles, the organic ligands on the complexes provide spacing between the catalyst atoms via steric hindrances such that the nanoparticles formed therefrom have an average particle size less than about 20 nm in diameter;
   (d) depositing either the organometallic complexes from (b) or the catalyst nanoparticles from (c) on an a conductive support material; and
   (e) incorporating the supported catalyst nanoparticles into a fuel cell electrode.

2. A method as in claim 1, wherein the solution is heated to a temperature greater than 60° C.

3. A method as in claim 1, wherein the solution is heated to a temperature greater than 95° C.

4. A method as in claim 1, wherein the formation of catalyst nanoparticles is at least partially caused by reducing the organometallic complexes with a reducing agent.

5. A method as in claim 1, wherein the nanoparticles have an average particle size less than about 10 nm.

6. A method as in claim 1, wherein the nanoparticles have an average particle size less than about 20 nm.

7. A method as in claim 1, wherein at least one of the organic ligands includes an available functional group capable of bonding to the support material.

8. A method as in claim 7, wherein the available functional group is selected from the group consisting of a carboxyl, a carbonyl, an amine, an amide, a nitrile, a nitrogen with a free lone pair of electrons, an amino acid, a thiol, a sulfonic acid, a sulfonyl halide, an acyl halide, and combinations thereof.

9. A method as in claim 1, wherein the organic ligands are provided as a dispersing agent comprising one or more of oxalic acid, malic acid, malonic acid, maleic acid, succinic acid, glycolic acid, lactic acid, glucose, citric acid, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybenzimidizoles, polypyridine, or sulfonated polyethylene terephthalate.

10. A method as in claim 1, the organic ligands being covalently bonded to the catalyst atoms during (b).

11. A method as in claim 1, the catalyst atoms being selected from one or more of noble metals, base transition metals, rare earth metals, or combinations thereof.

12. A method as in claim 1, the solution in (a) comprising a solvent selected from the group consisting of water, methanol, ethanol, n-propanol, isopropyl alcohol, acetonitrile, acetone, tetrahydrofuran, dimethylformamide, dimethylsulfoxide, methylene chloride, and combinations thereof.

13. A method as in claim 1, the nanoparticles being anchored to the support material through at least one of the ligands.

14. A method as in claim 1, the solution comprising at least about 10% water.

15. A method as in claim 1, the catalyst atoms in (b) being complexed with and caged between at least four organic ligands.

16. A method for manufacturing a fuel cell electrode having supported nanocatalyst particles, comprising:
   providing a solution comprising at least about 10% water, a plurality of catalyst atoms, and a plurality of organic ligands,
   heating the solution to a temperature greater than about 40° C. and allowing the catalyst atoms and the plurality of organic ligands to react to form a plurality of organometallic complexes in which each catalyst atom is complexed with and caged between at least three organic ligands, at least one of the three organic ligands including an available functional group for subsequent bonding to a support material;
   after forming the organometallic complexes, mixing the solution with a conductive support material to disperse the complexed and caged catalyst atoms on the support material;
   forming a plurality of nanoparticles on the support material from the organometallic complexes, wherein during formation of the nanoparticles on the support material from the organometallic complexes, the ligands provide spacing between the catalyst atoms via steric hindrances such that the nanoparticles formed from the organometallic complexes have an average particle size less than about 10 nm in diameter;
   causing or allowing the available functional group to bond to the support material; and
   incorporating the supported catalyst nanoparticles into a fuel cell electrode.

17. A method as in claim 16, the complexed catalyst atoms being ultrasonically suspended on the support.

18. A method as defined in claim 16, the aqueous solution comprising at least about 30% water.

19. A method for manufacturing fuel cell electrode, comprising:
   providing a solution comprising a plurality of catalyst atoms, each catalyst atom being complexed with and caged between at least three organic ligands,
      wherein the organic ligands comprise at least one member selected from the group consisting of oxalic acid, malic acid, malonic acid, maleic acid, succinic acid, glycolic acid, lactic acid, glucose, citric acid, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybenzimidizoles, polypyridine, or sulfonated polyethylene terephthalate,
      wherein at least one of the organic ligands includes an additional functional group capable of bonding to a support, wherein the available functional group is selected from the group consisting of a carboxyl, a carbonyl, an amine, an amide, a nitrile, a nitrogen with a free lone pair of electrons, an amino acid, a thiol, a sulfonic acid, a sulfonyl halide, an acyl halide, and combinations thereof; and forming a plurality of catalyst nanoparticles from the caged catalyst atoms and supporting the catalyst nanoparticles on a conductive support material, wherein at least a portion of the organic ligands (i) remain complexed to a portion of the catalyst atoms and (ii) are bonded to the support material so as to tether the catalyst nanoparticles to the support material; and incorporating the supported catalyst nanoparticles into a fuel cell electrode.

20. A method as in claim 1, the solution comprising at least about 30% water.

21. A method as in claim 1, the solution comprising at least about 50% water.

22. A method as in claim 16, the solution comprising at least about 50% water.

* * * * *

UNITED STATES PATENT AND TRADEMARK OFFICE
CERTIFICATE OF CORRECTION

PATENT NO. : 7,892,299 B2  
APPLICATION NO. : 11/264918  
DATED : February 22, 2011  
INVENTOR(S) : Zhou et al.

Page 1 of 4

It is certified that error appears in the above-identified patent and that said Letters Patent is hereby corrected as shown below:

The Title page, showing the illustrative figure, should be deleted and substitute therefor the attached Title page.

Title Page;  
Page 2, Item 56, References Cited, OTHER PUBLICATIONS, Right Hand Column  
Change the reference "Han, Sangjin, et al., "Simple Solid-Phase Synthesis of Hollow Graphitic Nanoparticles and their Appliation to Direct Methanol Fuel Cell Electrodes," *Adv. Mater.* 2003, 15, No. 22, Nov. 17, pp. 1922-1925." to --Han, Sangjin, et al., "Simple Solid-Phase Synthesis of Hollow Graphitic Nanoparticles and their Application to Direct Methanol Fuel Cell Electrodes," *Adv. Mater.* 2003, 15, No. 22, Nov. 17, pp. 1922-1925.--  
Change the reference "Zhen Liu, et al., "Formation of nanoparticles rings on heterogeneous soft surfaces," *IOP Electronic Journals,* Nanotechnology, 11 (Nov. 2004)." to --Zhen Liu, et al., "Formation of nanoparticle rings on heterogeneous soft surfaces," *IOP Electronic Journals,* Nanotechnology, 11 (Nov. 2004).--

Delete fig. 1 and substitute therefor the drawing sheets, consisting of fig. 1 as shown on the attached page.

Column 1  
Line 53, change "catalyst" to --catalysts--  
Line 54, change "lager" to --larger--

Column 2  
Line 4, change "catalysts" to --catalyst--

Column 3  
Line 8, change "invention" to --invention;--

Signed and Sealed this  
Twenty-sixth Day of July, 2011

David J. Kappos  
*Director of the United States Patent and Trademark Office*

Column 8
Line 45, change "and or" to --and/or--

Column 9
Line 12, change "catalysts" to --catalyst--
Line 29, change "catalyst" to --catalysts--
Line 53, change "electrolyte layer 10" to --electrolyte membrane 14--
Line 55, change "electrolyte layer 10" to --electrolyte membrane 14--
Line 59, change "Electrolyte layer 10" to --Electrolyte membrane 14--
Line 60, change "Electrolyte layer 10" to --Electrolyte membrane 14--

Column 11
Line 28, change "on an a" to --on a--

CERTIFICATE OF CORRECTION (continued)

(12) United States Patent
Zhou et al.

(10) Patent No.: US 7,892,299 B2
(45) Date of Patent: Feb. 22, 2011

(54) METHODS OF MANUFACTURING FUEL CELL ELECTRODES INCORPORATING HIGHLY DISPERSED NANOPARTICLE CATALYSTS

(75) Inventors: Zhenhua Zhou, Salian (CN); Zhihua Wu, Plainsboro, NJ (US); Bing Zhou, Cranbury, NJ (US)

(73) Assignee: Headwaters Technology Innovation, LLC, Lawrenceville, NJ (US)

(*) Notice: Subject to any disclaimer, the term of this patent is extended or adjusted under 35 U.S.C. 154(b) by 1240 days.

(21) Appl. No.: 11/264,918

(22) Filed: Nov. 1, 2005

(65) Prior Publication Data

US 2007/0060471 A1    Mar. 15, 2007

Related U.S. Application Data

(63) Continuation-in-part of application No. 11/228,568, filed on Sep. 15, 2005.

(51) Int. Cl.
| | |
|---|---|
| H01C 17/28 | (2006.01) |
| B01J 21/00 | (2006.01) |
| B01J 23/00 | (2006.01) |
| B01J 25/00 | (2006.01) |
| B01J 29/00 | (2006.01) |
| H01M 4/88 | (2006.01) |
| B01J 31/00 | (2006.01) |

(52) U.S. Cl. ............... 29/623.1; 502/100; 502/101; 502/150; 502/172

(58) Field of Classification Search ............... 29/623.1, 29/621.3; 502/100, 101, 150, 172
See application file for complete search history.

(56) References Cited

U.S. PATENT DOCUMENTS

| | | | |
|---|---|---|---|
| 3,992,331 A | 11/1976 | Petrow et al. | 502/339 |
| 4,070,401 A | 1/1978 | Hirai et al. | 564/417 |
| 4,148,750 A | 4/1979 | Pine | 502/26 |
| 4,336,238 A | 6/1982 | Dalton, Jr. et al. | 423/584 |
| 4,336,240 A | 6/1982 | Moseley et al. | 423/584 |
| 4,347,231 A | 8/1982 | Michaelson | 423/584 |
| 4,347,232 A | 8/1982 | Michaelson | 423/584 |
| 4,366,085 A | 12/1982 | Ikegami et al. | 502/155 |

(Continued)

FOREIGN PATENT DOCUMENTS

CN    02106201.3    4/2002

(Continued)

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).

(Continued)

*Primary Examiner*—James E McDonough
(74) *Attorney, Agent, or Firm*—Workman Nydegger

(57) ABSTRACT

Nanoparticle catalysts are manufactured by first preparing a solution of a solvent and a plurality of complexed catalyst atoms. Each of the complexed catalyst atoms has at least three organic ligands. The complexed catalyst atoms are reduced to form a plurality of nanoparticles. During formation of the nanoparticles, the organic ligands provide spacing between the catalyst atoms via steric hindrances and/or provide interactions with a support material. The spacing and interactions with the support material allow formation of small, stable, and uniform nanoparticles. The supported nanoparticle catalyst is then incorporated into a fuel cell electrode.

22 Claims, 3 Drawing Sheets